(12) United States Patent
Ehlen et al.

(10) Patent No.: US 10,065,139 B2
(45) Date of Patent: Sep. 4, 2018

(54) FILTER MODULE HAVING A PLURALITY OF REPLACEABLE HOLLOW-FIBER BUNDLES IN AN END-FACE PLATE

(71) Applicant: MANN+HUMMEL GMBH, Ludwigsburg (DE)

(72) Inventors: Frank Ehlen, Neunkirchen (DE); Tobias Woerz, Leutenbach (DE); Sabine Giesselmann, Ludwigsburg (DE); Jasmine Jarczak, Schwieberdingen (DE); Marcel Mayer, Stuttgart (DE); Steffen Schuetz, Bietigheim-Bissingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 15/011,956

(22) Filed: Feb. 1, 2016

(65) Prior Publication Data

US 2016/0151728 A1 Jun. 2, 2016

Related U.S. Application Data

(63) Continuation of application No. PCT/EP2014/066279, filed on Jul. 29, 2014.

(30) Foreign Application Priority Data

Jul. 31, 2013 (DE) .................. 10 2013 012 674

(51) Int. Cl.
*B01D 63/02* (2006.01)
*B01D 39/16* (2006.01)
*B01D 63/04* (2006.01)
*B01D 35/30* (2006.01)
*B01D 39/20* (2006.01)

(52) U.S. Cl.
CPC ......... *B01D 39/1607* (2013.01); *B01D 35/30* (2013.01); *B01D 39/2082* (2013.01); *B01D 63/021* (2013.01); *B01D 63/043* (2013.01); *B01D 2313/02* (2013.01);
(Continued)

(58) Field of Classification Search
CPC ...................... B01D 39/1607; B01D 39/2082; B01D 39/18; B01D 35/30; B01D 35/306; B01D 63/021; B01D 63/043; B01D 63/02; B01D 63/04; B01D 2313/02; B01D 2313/04; B01D 2319/04; B01D 2319/06;
(Continued)

(56) References Cited

U.S. PATENT DOCUMENTS 3,228,797 A * 1/1966 Brown ................ H01M 8/1023
429/498
6,626,235 B1 * 9/2003 Christie .................. F28D 7/106
165/158
(Continued)

FOREIGN PATENT DOCUMENTS

DE 2456493 A1 8/1975
DE 3839985 A1 2/1990
(Continued)

*Primary Examiner* — Claire A Norris
*Assistant Examiner* — Julia L. Wun
(74) *Attorney, Agent, or Firm* — James Hasselbeck

(57) ABSTRACT

A filter module has hollow fibers which are combined into fiber bundles having end face pottings. The pottings of the fiber bundles are received into a common end disk.

8 Claims, 3 Drawing Sheets

(52) U.S. Cl.
CPC ...... *B01D 2313/04* (2013.01); *B01D 2313/54* (2013.01); *B01D 2319/04* (2013.01); *B01D 2319/06* (2013.01)

(58) Field of Classification Search
CPC .............. B01D 2313/54; B01D 69/082; B01D 2053/223; B01D 2053/224
USPC ............. 210/321.87, 321.88, 321.89, 500.23
See application file for complete search history.

(56) References Cited

U.S. PATENT DOCUMENTS

| | | | |
|---|---|---|---|
| 6,887,304 B2* | 5/2005 | Stroh | .................. B01D 63/021 210/321.89 |
| 2001/0035374 A1 | 11/2001 | Yamamoto et al. | |
| 2004/0188339 A1* | 9/2004 | Murkute | ................ B01D 61/18 210/321.8 |
| 2004/0200768 A1 | 10/2004 | Dannenmaier et al. | |
| 2005/0126982 A1 | 6/2005 | Stachera et al. | |
| 2008/0135497 A1 | 6/2008 | Fuchs et al. | |
| 2008/0152893 A1 | 6/2008 | Stroh et al. | |
| 2011/0036764 A1 | 2/2011 | Lin | |
| 2013/0168307 A1 | 7/2013 | Drivarbekk et al. | |

FOREIGN PATENT DOCUMENTS

| | | |
|---|---|---|
| JP | H08290043 A | 11/1996 |
| JP | H10263370 A | 10/1998 |
| WO | 2004043578 A1 | 5/2004 |

* cited by examiner

FILTER MODULE HAVING A PLURALITY OF REPLACEABLE HOLLOW-FIBER BUNDLES IN AN END-FACE PLATE

TECHNICAL FIELD

The present invention relates to a filter module having hollow fibers, which are clamped between two pottings.

BACKGROUND

Known are filter modules having ceramic hollow fibers running parallel to one another and being enclosed at the end face in disk-shaped pottings which may also be comprised of a ceramic material (DE 10 2005 008 900 A1). The filter unit having the hollow fibers and the pottings is inserted into a cylindrical housing, wherein the pottings form the end face closure.

During filtering, the hollow fibers are through-flown in the longitudinal direction by the fluid to be cleaned, the substance to be filtered (feed) can pass through the porous walls of the hollow fibers and purified permeate can collect in the housing interior from which the substance is discharged. The purified fluid is subsequently discharged at the axially opposite side of the hollow fibers.

Such filter modules are, for example, described in the publication WO 12/004304 A2 or the publication EP 1 691 914 B1.

In addition, known are filter modules having hollow fibers which are combined into fiber bundles, a plurality of such fiber bundles being disposed in the filter module and the end faces of all fiber bundles being received in an end face potting. Such a filter module is, for example, described in the publication US 2001/035374 A1.

SUMMARY

The object of the present invention is to configure in a simple manner a stable and easy-to-install filter module having hollow fibers.

The filter module according to the present invention has a filter housing and a filter unit inserted into the filter housing, the filter unit comprising a plurality of hollow fibers combined into fiber bundles. Each fiber bundle is comprised of a plurality of individual hollow fibers running parallel to one another, which are enclosed at the end faces by pottings. Hollow fibers having end face pottings are assigned to each fiber bundle. The filter unit comprises at least two, preferably a greater number of fiber bundles having end face pottings. The pottings of all fiber bundles are received at an end face in a common end disk, which is fixedly arranged at the housing and which is connected to the filter housing.

In contrast to embodiments from the prior art, each fiber bundle is provided with a plurality of hollow fibers at both end faces having respectively one potting, the pottings of different fiber bundles being formed independently and separately from one another. In this manner, a plurality of pottings, which are received and held at a common end disk, result at the end faces of the filter unit.

This embodiment has the advantage that the fiber bundles are manufacturable independently from one another and are integratable into the filter unit of the filter module. This enables to replace individual fiber bundles if needed, in particular, in the case of defective, individual hollow fibers in a fiber bundle. Conversely, it is not required to replace the complete filter unit having all fiber bundles and hollow fibers.

Moreover, it is advantageous that each fiber bundle has, with reference to the overall number, a smaller number of hollow fibers. Particularly during the manufacture and installation, smaller holding forces appear in the fiber bundles, as a result of which the risk of a fiber breakage or fiber pinch is reduced.

Furthermore, it is possible to replace existing filter units in filter modules having hollow fibers by the filter unit according to the present invention having a plurality of fiber bundles, each of which are provided with a potting at the end face.

According to an advantageous embodiment, the end disk, in which the pottings of the fiber bundles are held, is implemented as a perforated disk and has recesses for receiving the pottings. This has the advantage that the pottings of the fiber bundles are positively received in the radial direction into the end or perforated disk and that they can stay in a precisely defined relative position between the fiber bundles or the pottings. The axial insertion of the pottings in the recesses of the perforated disk and also the removal can be carried out in a simple manner.

The pottings of a fiber bundle are, according to a further expedient embodiment, enclosed by a sealing ring in the area of the end disk to separate the raw and the clean side. One sealing ring is assigned to each potting. In the case of an embodiment of the end disk as a perforated disk, it may be advantageous to situate two perforated disks directly parallel to each other and to pinch the sealing rings between the perforated disks for enclosing the pottings. For example, this may be carried out in a manner in which one or both perforated disk(s) has/have a slant in the area of receiving the sealing ring, as a result of which a seal seat is formed for receiving the sealing ring. If the perforated disks are connected to each other, for example, by screwing, the in-between sealing ring is axially pinched and, owing to the slant, pressed radially inwards in the direction of the recess in the perforated disks so that the sealing ring abuts with a radial contact force at the wall of the potting. In doing so, the tightness is improved.

Advantageously, each fiber bundle is provided with respectively one potting in the area of its opposite lying end faces. The pottings on opposite sides are each received at one end disk, which optionally may be embodied as a perforated disk. As has been described above, each end face can have two perforated disks directly adjoining each other and to be connected to each other, having intermediate sealing rings for enclosing the pottings.

The hollow fibers may be made of ceramic. The pottings may also be made out of a ceramic material. In an alternative embodiment, the hollow fibers can, for example, be formed from polymer hollow fibers.

Different cross-sectional geometries come into consideration for the pottings and the fiber bundles. In a simple embodiment, the potting has a round cross section and the hollow fibers in the fiber bundle are respectively uniformly distributed over the round cross section. Other cross-sectional geometries come also into consideration, for example, rectangular, particularly square, shapes of pottings and a respective distribution of the hollow fibers and sector-shaped or segment-shaped geometries or other, angular, curved or combinations of angular and curved geometries. Furthermore, it is possible to either provide only similar cross-sectional geometries, which all have the same size or also different sizes, or different cross-sectional geometries.

For example, it may be expedient to provide a round overall cross section of the filter unit and, within the filter unit, a plurality of fiber bundles each having a round cross-sectional geometry, and fiber bundles and pottings having the same diameter as well as having a different diameter may be provided within the filter unit. For example, two or three round cross-sectional geometries having different diameters can be arranged, the smaller fiber bundle cross sections filling in the intermediate gaps between the greater fiber bundle cross sections.

In a likewise round overall cross section of the filter unit, the individual fiber bundles and their pottings can, for example, have a sector-shaped cross-sectional geometry in the manner of a pie segment, a plurality of such sector-shaped fiber bundles extending in a distributive manner over the circumference within the filter unit. Each sector runs in the radial direction approximately from the center of the filter unit to the radially outer edge. In an alternative embodiment, the sectors are divided into at least two segments, which has the advantage that a smaller number of hollow fibers is provided per segment; however, the overall number of hollow fibers is not or only insignificantly reduced.

Advantageously, hollow fibers of the same diameter are employed in the different fiber bundles. It is, however, also possible to use hollow fibers having a different diameter. However, always the same hollow fibers are preferably provided per fiber bundle.

BRIEF DESCRIPTION OF THE DRAWINGS

Further advantages and expedient embodiments may be concluded from the further claims, the description of the figures and the drawings.

In the figures, same components are provided with the same reference characters.

DETAILED DESCRIPTION

Figure 1:
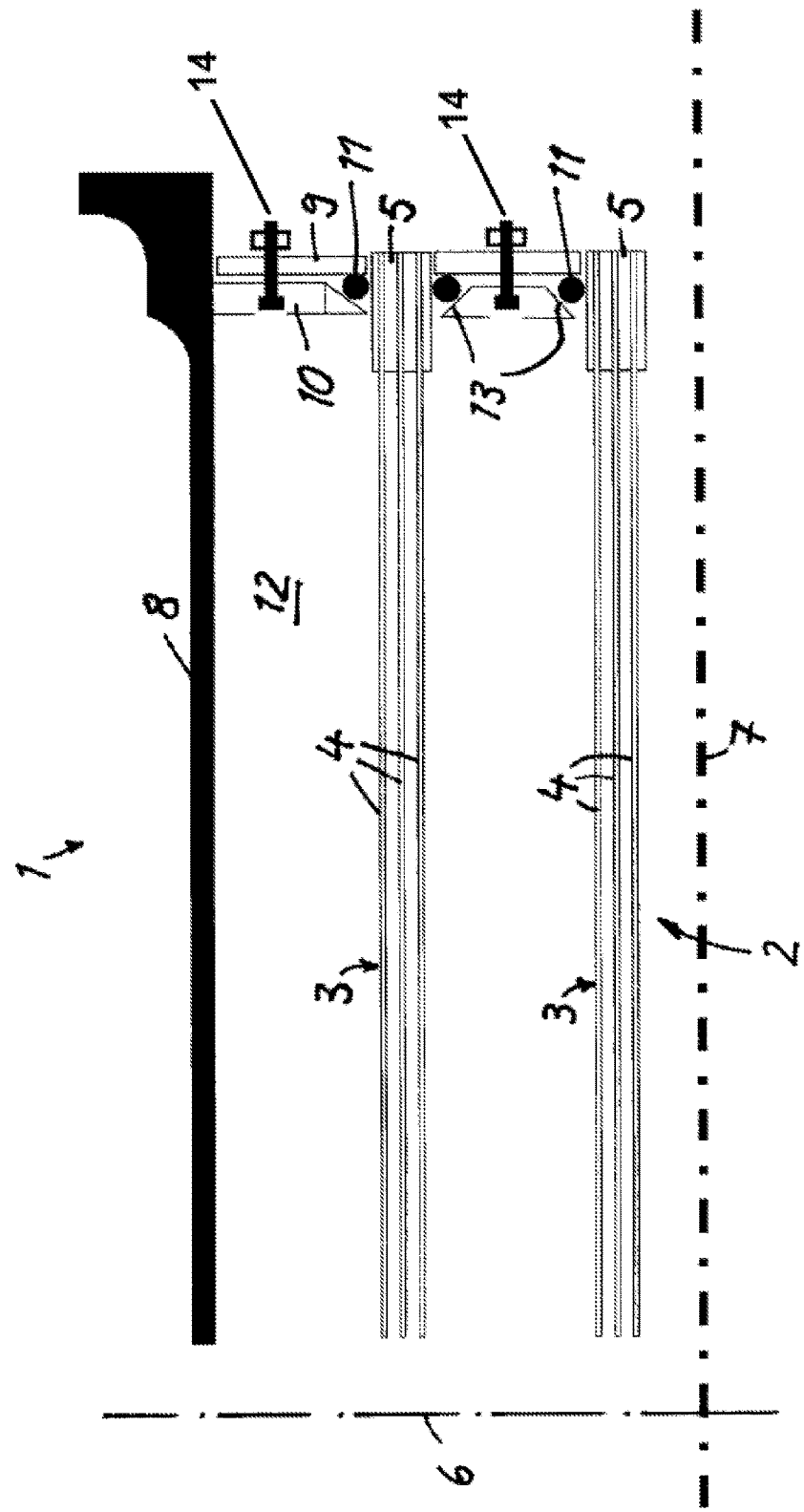
FIG. 1 shows a section longitudinally through a filter module having hollow fibers which are combined into fiber bundles having pottings at the end faces, the pottings being received into the end face perforated disks.
Figure 2:
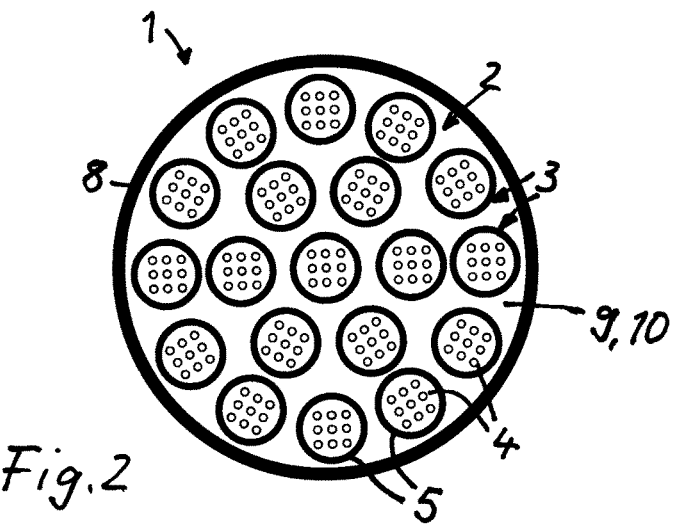
FIG. 2 shows a section across the longitudinal axis through a filter unit in the area of an end face perforated disk, the fiber bundles having a round cross-sectional geometry.

FIG. 1 shows a cross section of a cylindrical filter module 1 for filtering gaseous or liquid fluids. Filter module 1 has a filter unit 2 comprising a plurality of fiber bundles 3, each of which have ceramic hollow fibers 4 having end face pottings 5. Filter module 1 and filter unit 2 therein received are designed symmetrically to a mirror axis 6 extending orthogonally to longitudinal axis 7 of filter module 1. Accordingly, hollow fibers 4 of a fiber bundle 3 are received at both end faces into pottings 5. Overall filter unit 2 having fiber bundles 3 is received into a filter housing 8.

Hollow fibers 4 are preferably comprised of ceramic, an embodiment made from a different material, for example, polymer, also coming into consideration. End face pottings 5 of each fiber bundle 3 can also be manufactured from a ceramic material. Hollow fibers 4 close off at their end faces with pottings 5 so that an axial inflow and outflow of fluid via the end faces of pottings 5 into or out of hollow fibers 4 is possible.

Each fiber bundle 3 is designed independently from further fiber bundles and comprises, in addition to hollow fibers 4, respectively one potting at each end face. Pottings 5 of different fiber bundles are formed separately and independently from one another and are received into end face perforated disks 9, 10, into which recesses are introduced, which correspond with pottings 5. Pottings 5 are inserted into the recesses in perforated disks 9, 10 and are held positively in the radial direction—with reference to longitudinal axis 7—by said recesses.

Between perforated disks 9, 10, sealing rings 11 are received, which abut at the circumferential side of pottings 5 and form a flow-proof closure between interior 12 of filter unit 2 and the space upstream of the end faces. For receiving sealing rings 11, perforated disk 10 is provided with a slant 13; perforated disks 9, 10 are held together by connecting screws 14, sealing ring 11 being, at an increasing contact pressure between perforated disks 9, 10, axially compressed by slant 13 and pressed radially against the circumferential side of pottings 5. In this manner, a radial contact force of sealing ring 11 onto potting 5 and a high tightness are ensured.

FIGS. 2 through 6 show different exemplary embodiments of filter modules 1 having fiber bundles 3 in different cross-sectional geometries. According to FIG. 2, filter housing 8 has a cylindrical cross section; fiber bundles 3 of filter unit 2, which is received into filter housing 8, have a round cross-sectional geometry. Accordingly, pottings 5 are embodied in a round manner at the end faces of hollow fibers 4 and fiber bundles 3 are at least approximately uniformly distributed along the round cross-sectional geometry. Fiber bundles 3 having pottings 5, all have the same diameter within filter unit 2. Pottings 5 are received into perforated disks 9, 10. With reference to the overall diameter of filter module 1, fiber bundles 3 are uniformly distributed.

Figure 3:
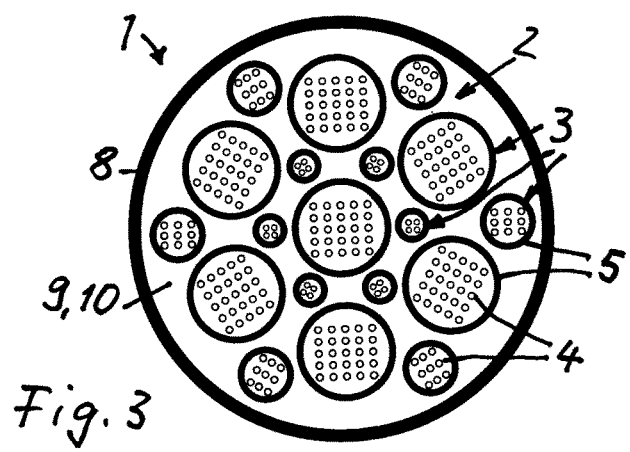
FIG. 3 shows an illustration corresponding to FIG. 2; however, it has fiber bundles and pottings of different diameters.

In the exemplary embodiment according to FIG. 3, fiber bundles 3 having pottings 5 also have a round cross-sectional geometry; however, cross-sectional geometries having different diameters are provided. Overall, fiber bundles 3 have three different diameters which significantly differ from one another. This makes it possible to fill in the gaps between the fiber bundles having a greater diameter by those fiber bundles having a smaller diameter.

Figure 4:
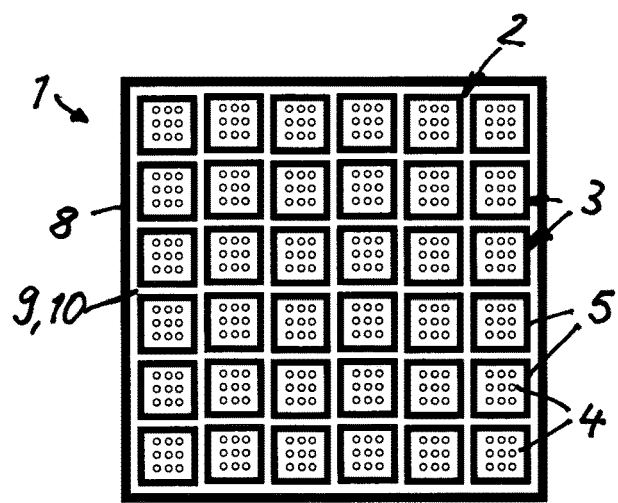
FIG. 4 shows an exemplary embodiment having square pottings and fiber bundle cross-sectional geometries.

In the exemplary embodiment according to FIG. 4, filter module 1 has a square overall cross section. Fiber bundles 3 having pottings 5 are each also embodied in a square manner.

Figure 5:
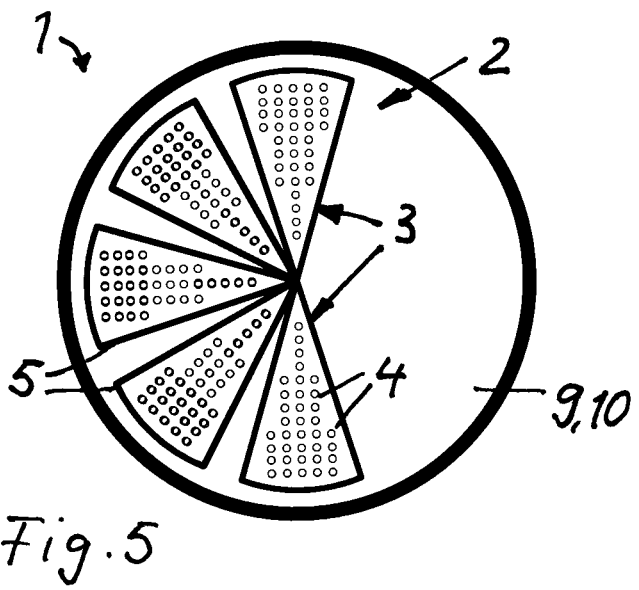
FIG. 5 shows an exemplary embodiment having sector-shaped pottings and fiber bundles cross-sectional geometries.

In the exemplary embodiment according to FIG. 5, fiber bundles 3 and pottings 5 are formed in a sector-shaped manner and extend starting from the central longitudinal axis radially outwards. Gaps lie in between individual sector-shaped fiber bundles 3 so that in the interior of filter unit 2 a sufficiently large internal space for receiving the permeate, which passes radially through the wall of the hollow fibers, is formed.

Figure 6:
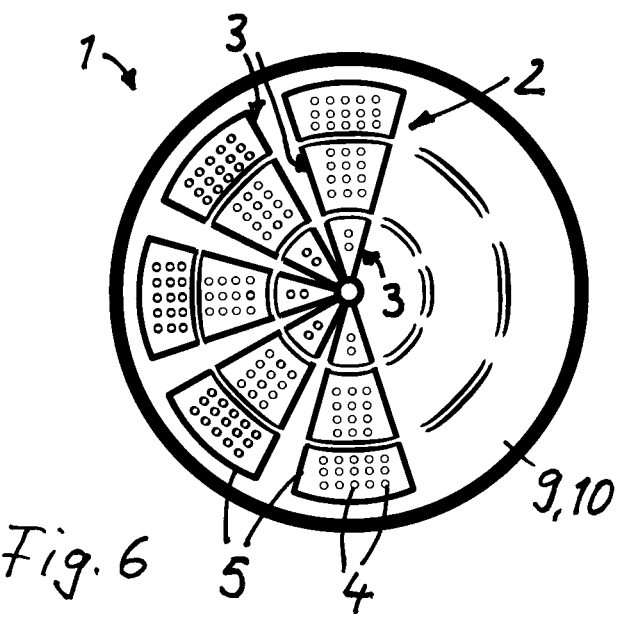
FIG. 6 shows an exemplary embodiment having segment-shaped pottings and fiber bundles cross-sectional geometries.

In the exemplary embodiment according to FIG. 6, fiber bundles 3 are formed in a segment-shaped manner, three individual segments combining in the radial direction into a sector; however, the individual segments are formed independently from one another.

What is claimed is:

1. A filter module comprising:
   a filter housing;
   a plurality of hollow fiber fluid filtration units inserted into the filter housing, each hollow fiber fluid filtration unit having:
      a plurality of porous hollow fibers consisting of filter material, the hollow fibers having porous outer walls such that filtered fluid permeate flows radially outwardly from a hollow interior of the fibers through the porous walls and is thereby separated from the unfiltered fluid, the plurality of hollow fibers of filter material clamped between two pottings;
   wherein the filter material is a ceramic porous filtration material or polymer porous filtration material;
   wherein the plurality of porous hollow fibers of filter material are respectively combined into a fiber bundle having pottings at end faces of the porous hollow fibers, forming the hollow fiber fluid filtration unit;
   wherein the pottings of the fiber bundle lying at the same end face are received into a common end disk;
   wherein the common end disk includes:
      an inner perforated end disk having first recesses into which the pottings are received; and
      an outer perforated end disk arranged immediately adjacent to and connected onto the inner perforated end disk, the outer perforated end disk having second recesses into which the pottings are received,
      wherein first and second recesses are aligned such that fiber bundle pottings extend through respective ones of both the first and second recesses of the inner and outer perforated end disks;
   a sealing ring arranged at and circumferentially surrounding the pottings of respective fiber bundles,
   wherein a circumferential wall of the first recesses of the inner perforated end disk has a slanted circumferential surface, the slanted circumferential surface radially pressing the sealing ring against an outer surface of the pottings as the inner perforated end disk is moved towards and tightened against the outer perforated end disk, sealing between the pottings and the inner perforated end disk and the outer perforated end disk;
   wherein a first set of the hollow fiber fluid filtration units are arranged adjacently and spaced apart in the filter housing, and forming intermediate gaps between adjacent hollow fiber fluid filtration units of the first set; and
   further including one or more additional sets of the hollow fiber fluid filtration units, each having a smaller fiber bundle cross-section than a fiber bundle cross-section of the first set, the one or more additional sets of hollow fiber fluid filtration units adapted to be fit into otherwise unusable intermediate gaps between adjacent hollow fiber fluid filtration units of the first set, providing additional filtration media resulting in additional filtration surface area to the filter module, thereby efficiently using intermediate gaps to improve fluid filtration capacity of the filter module.

2. The filter module according to claim 1, wherein the pottings of at least one fiber bundle of the fiber bundles have a round cross-sectional geometry and that the fibers of at least one fiber bundle and/or the fiber bundles are arranged in a respective cross-sectional geometry.

3. The filter module according to claim 1, wherein the pottings of at least one fiber bundle of the fiber bundles have a rectangular cross-sectional geometry and that the fibers of the at least one fiber bundle and/or the fiber bundles are arranged in a respective cross-sectional geometry.

4. The filter module according to claim 1, wherein the pottings of at least one fiber bundle of the fiber bundles have a sector-shaped cross-sectional geometry and the fibers of the at least one fiber bundle and/or the fiber bundles are arranged in a respective cross-sectional geometry.

5. The filter module according to claim 1, wherein the pottings of at least one fiber bundle of the fiber bundles have a segment-shaped cross-sectional geometry and that the fibers of the at least one fiber bundle and/or the fiber bundles are arranged in a respective cross-sectional geometry.

6. The filter module according to claim 1, wherein the pottings or the fiber bundles of different cross-sectional sizes and/or cross-sectional geometries are provided in the filter module.

7. The filter module according to claim 1, wherein the filter material is the ceramic porous filtration material.

8. The filter module according to claim 7, wherein the pottings are made of a ceramic material.

* * * * *